Oct. 23, 1956     H. O. SCHMITT, JR     2,767,474
FOOTAGE INDICATOR FOR STRIP MATERIAL
Filed June 15, 1953
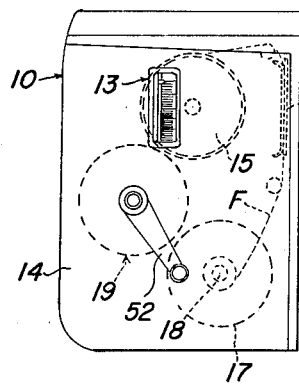
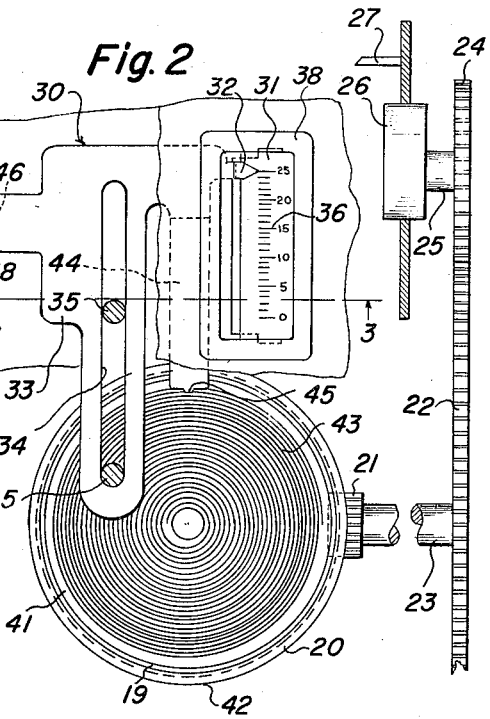
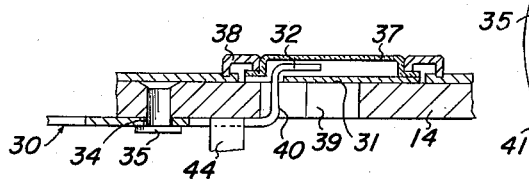
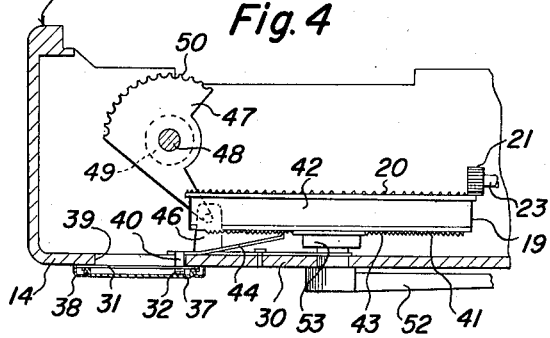
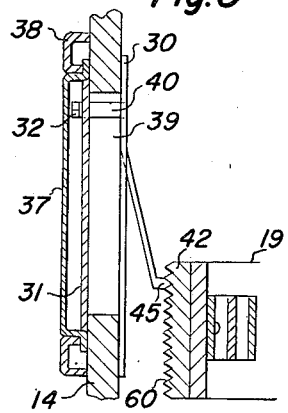
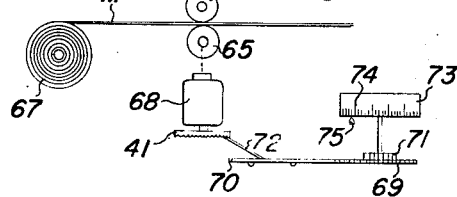
HENRY O. SCHMITT JR.
INVENTOR.
BY
ATTORNEY & AGENT

United States Patent Office 2,767,474
Patented Oct. 23, 1956

2,767,474

FOOTAGE INDICATOR FOR STRIP MATERIAL

Henry O. Schmitt, Jr., Rochester, N. Y., assignor to Eastman Kodak Company, Rochester, N. Y., a corporation of New Jersey Application June 15, 1953, Serial No. 361,639

4 Claims. (Cl. 33—127)

The present invention relates to a footage indicator for strip material and more particularly to an indicator which is directly coupled to the means for advancing the strip material and which permits the use of a scale having uniform linear graduations.

In footage indicators of the type for denoting the amount of a strip material moved past a fixed station, or the amount of a strip material remaining on a supply member, as it is continuously or intermittently advanced, it is well known to actuate a footage indicator from the reduction in diameter of the strip material convolutions on the supply member as it is removed therefrom or from a member on the advancing means which intermittently advances the indicator by means of a tripping mechanism. The first type has the disadvantage of having to utilize a scale on which the graduations are non-uniformly spaced due to the non-uniform movement of the member engaging the outer convolution of the strip material and actuating the indicator. While the intermittent type permits the use of a linear scale, it has the disadvantage of usually necessitating a more complicated structure in order to permit resetting of the indicator.

The present invention eliminates the disadvantages of the other types of indicators and combines the advantages of both to provide a simple, compact and accurate footage indicator. Such an indicator permits the use of a scale having uniform graduations, is continuously indicative, is directly coupled to the drive means at all times and is capable of being set to any indication in both directions of movement.

Such an indicator for denoting the amount of a strip material moved past a station comprises a drive means for moving the strip material past the station; an indicating means which includes a fixed scale member and a movable scale member; one of the scale members having an index and the other scale member having uniform linear graduations; a member rotatable with the drive means and provided with a continuous spiral groove having a pitch corresponding to the amount of the strip material moved past the station during each revolution of the drive means; a resilient intermediate member engaging the spiral groove for moving the movable scale member radially of the rotatable member and in a plane parallel to that of the spiral groove; and setting means for moving the movable scale member and intermediate member independently of the spiral groove.

The primary object of the invention is, therefore, to provide an indicator for strip material in which the movable scale member is directly coupled to the drive means for the strip material and utilizes a linear uniform scale.

Another object of the invention is to provide an indicator for strip material in which a member rotatable with the drive means is provided with a continuous spiral groove having a constant pitch for moving a movable scale member radially thereof in a plane parallel thereto and with respect to a fixed scale member.

A further object of the invention is to provide a footage indicator for strip material in which a movable scale member has a resilient stylus member for engaging a continuous spiral groove in a member rotatable with the drive means for movement thereby, the stylus being movable independently of the spiral groove for setting with respect to a fixed scale member.

And still another object of the invention is to provide a footage indicator for strip material which is simple in structure, inexpensive to manufacture and reliable in operation.

These and other objects and advantages will be apparent to those skilled in the art by the description which follows.

Reference is now made to the accompanying drawing in which like reference numerals designate like parts and wherein:

Fig. 1 is a side elevation of a motion picture camera in which the invention has been embodied;

Fig. 2 is an elevation view of the elements comprising the footage indicator and showing the relation of said elements to the rotatable member provided with the spiral groove;

Fig. 3 is a partial sectional view taken substantially on line 3—3 of Fig. 2;

Fig. 4 is a side elevation of the footage indicator within the casing of the camera and showing the setting member therefor;

Fig. 5 is a partial side elevation of another embodiment of the invention and showing the spiral groove in the peripheral surface of the spring motor housing; and Fig. 6 is a diagrammatic view of an embodiment of the footage indicator to a strip material feeding device.

With reference to the accompanying drawing, the footage indicator is disclosed as embodied in a motion picture camera for indicating the amount of film remaining on the supply reel. However, the footage indicator is not to be considered as being limited to only such an application but can be applied with equal facility to most any apparatus in which a strip material is moved past a station or with respect to a fixed point. The footage indicator about to be described permits the use of a linear scale, that is, a scale having graduations of uniform spacing to indicate the footage and such a scale can be a flat scale or drum type scale depending on the application. Further, it is to be understood that the arrangement of the numerals on the scale indicates either the amount of strip material moved past the station or the amount remaining on the supply reel depending on the disposition of the numerals along the scale. Also, the scale may be part of the movable scale member and moved with respect to the fixed scale member having an index, or vice versa, the final result being the same in either instance.

In Fig. 1, the footage indicator is disclosed as being embodied in a motion picture camera comprising a casing 10, a lens 11 mounted on front wall 12 and a footage indicator 13 arranged on side wall 14. As is well-known in the photographic art, the strip material, or film F, is moved from supply reel 15 past a station or gate 16 having an exposure aperture aligned with lens 11 to a take-up reel 17. The reels 15 and 17 and gate 16 can be individually arranged within casing 10 or be contained within a separate magazine, as is well-known. In either event, shaft 18 on which reel 17 is mounted or which is coupled to take-up reel 17 when mounted in a magazine is driven from a conventional type spiral spring motor 19 by any suitable arrangement of gears or other mechanism not shown.

The drive means for moving the film F past gate 16 comprises spring motor 19 which has a crown gear 20 fixed thereto, a pinion 21, a gear 22 secured to shaft 23 with pinion 21, a gear 24 meshing with gear 22 and secured to shaft 25, an eccentric 26 also fixed to shaft 25, and a claw member 27 for intermittently moving the film strip by engaging the film perforations, as is well-known in the art.

The indicating means comprises a movable scale member 30 and a fixed scale member 31. The movable scale 30 comprises an index element 32 and a mounting portion 33 provided with an elongated slot 34 for slidably mounting member 30 on the inside surface of wall 14 of casing 10 by means of suitable rivets or screws 35. The fixed scale member 31 is mounted on the outside of wall 14 and is provided with graduations 36 which are uniformly spaced therealong. A formed glass or transparent plastic cover 37 covers member 31 and is retained by bezel member 38. Member 31 partially overlies aperture 39 in wall 14 and index 32 is formed as shown at 40, in Fig. 3, to extend through aperture 39 and overlie scale member 31.

In order to move index 32 with respect to the fixed scale member 31, a circular plate or disc 41 is secured to housing 42 of spring motor 19 for rotation therewith and is provided with a spiral groove 43 which is continuous and of constant pitch. Since a single revolution of motor 19 causes a predetermined amount of film to be moved through gate 16, by providing a spiral groove with a constant pitch the revolutions of spring motor 19 are converted to linear movement of the movable scale member 30 thereby permitting the use of a uniform linear scale on member 31.

The movable scale member 30 is moved by an intermediate member 44 which may be formed integral with or secured to member 30. In Fig. 2 such a member is shown between index 32 and mounting portion 33 and has a stylus 45 for engaging spiral groove 43. Member 44 is preferably of a resilient material for permitting movement of member 30 with respect to member 31 independently of groove 43. From Figs. 2 and 4 it will be noted that member 44 is movable radially of groove 43 and that movable scale member 30 is movable in a plane parallel to that of groove 43 or the top surface of plate 41.

A vertical extension 46 is formed to one side of mounting portion 33 and is connected to one end of a setting member 47 which is pivotally mounted by screw 48 to boss 49. The other end of said setting member provides an actuating surface 50 for moving movable scale member 30 in either direction with respect to groove 43 and fixed scale member 31. Accordingly, index 32 can be moved to any position along scale 31 for setting the indicator to any starting position. Since intermediate portion 44 is resilient and groove 43 is formed by equally inclined side walls, movement in either direction is easily accomplished.

In operation, spring motor 19 is wound by handle 52 through an overrunning clutch of conventional design and designated generally at 53. Upon actuation of a conventional release member, spring motor housing 42 is rotated and rotates gear 20 and plate member 41 therewith, the film F being moved intermittently by claw 27 through eccentric 26, gears 24 and 22, and pinion 21 meshing with gear 20. As plate 41 is rotated, stylus 45 in engagement with groove 43 causes member 30 to be moved inwardly toward the center of plate 41, index 32 being moved with respect to graduations 36 to denote the amount of film remaining on supply reel 15. As pointed out hereinbefore, the numerals shown in Fig. 2 can be reversed; that is, the scale would thus be made to indicate the amount of film moved past or through gate 16. The same result is obtained in the disclosed arrangement, however, by noting the position of index 32 with respect to the graduations and subtracting this amount from the largest figure on the scale. In the event only a portion of the film within a magazine has been exposed and it is desired to reinsert the partially exposed magazine in the camera, setting member 47 is then rotated about its pivot 48 until index 32 is observed to be opposite the graduation corresponding to the unexposed footage in the magazine.

Another embodiment of the invention is disclosed in Fig. 5 in which housing 42 of spring motor 19 is provided with a spiral groove 60 on the peripheral surface thereof for moving scale member 30 in a vertical or horizontal direction depending on the disposition of motor 19.

In Fig. 6 another embodiment of the invention is disclosed in which a strip material M is removed by feed rollers 65 and 66 from supply reel 67, roller 65 being driven by motor 68. The plate member 41 may be secured directly to the motor shaft or to any other rotatable member such as an intermediate gear in a train driven by the motor for providing a suitable reduction factor. In this instance a rack 69 is formed along a suitable edge of a movable member 70 similar to movable scale member 30 and meshes with pinion 71. The linear movement of member 70 by portion 72 engaging the spiral groove rotates a drum 73 by means of pinion 71 engaging rack 69, the drum having a uniform linear scale 74 which is movable with respect to the fixed index 75. The movable scale member then includes the drum 73, the interconnection between drum 73 and member 70 as well as the member 70.

Since many other modifications and applications of the invention will be suggested and apparent to those skilled in the art, the scope of the invention is defined in the appended claims.

Having now particularly described my invention, what I desire to secure by Letters Patent of the United States and what I claim is:

1. A device for indicating the amount of movement of a strip material past a station comprising a drive means for moving said strip material past said station, an indicating means including a fixed scale member, a movable scale member adapted to be moved relative to said fixed scale member, an index on one of said scale members and uniform graduations on the other of said scale members, a rotatable member displaced in a plane parallel to the plane of said fixed scale member and operatively connected to said drive means and provided about the center of rotation thereof with a plane continuous spiral groove, the pitch of said spiral groove corresponding to the amount of said strip material moved past said station during a single revolution of said drive means, a resilient intermediate member operatively connected to said movable scale member and engaging said spiral groove for movement thereby radially of said rotatable member and for moving said movable scale member relative to said fixed scale member, and setting means operatively connected to said movable scale member for moving said movable scale member and intermediate member with respect to said fixed scale member independently of said spiral groove and said drive means.

2. A device for indicating the amount of movement of a strip material past a station comprising a casing, a drive means for moving said strip material past said station, an indicating means including a scale member fixed to said casing, a movable scale member slidably mounted on said casing for movement relative to said fixed scale member; an index on one of said scale members and uniform linear graduations on the other of said scale members, a rotatable member within said casing and operatively connected to said drive means and provided on a surface thereof with a plane continuous spiral groove having a constant pitch, a resilient intermediate member operatively connected to said movable scale member and engaging said spiral groove for moving said movable scale member relative to said fixed scale member, and setting means within said casing operatively connected to said movable scale member for moving said movable scale member and intermediate member independently of said spiral groove and said drive means to any position with respect to said fixed scale member.

3. A device for indicating the amount of movement of a strip material past a station comprising a casing, a drive means for moving said strip material past said station, an indicating means including a scale member fixed to said casing, a movable scale member slidably mounted on said casting adjacent said fixed scale member, an index on one of said scale members and uniform linear graduations on the other of said scale members, a plate member displaced within said casing in a plane parallel to the plane of said fixed scale member and rotatable with said drive means and provided on a surface thereof with a plane continuous spiral groove having a constant pitch corresponding to the amount of said strip material moved past said station during a single revolution of said drive means, and a resilient stylus member integral with said movable scale member and engaging said spiral groove for movement thereby radially of said plate member and for moving said movable scale member relative to said fixed scale member.

4. A device for indicating the amount of movement of a strip material past a station comprising a casing, a drive means for moving said strip material pass said station, an indicating means including a scale member fixed to said casing, a movable scale member slidably mounted on said casing adjacent said fixed scale member, an index on one of said scale members and uniform linear graduations on the other of said scale members, a plate member displaced within said casing in a plane parallel to the plane of said fixed scale member and rotatable with said drive means and provided on a surface thereof with a plane continuous spiral groove having a constant pitch corresponding to the amount of said strip material moved past said station during a single revolution of said drive means, a resilient stylus member integral with said movable scale member and engaging said spiral groove for movement thereby radially of said plate member and for moving said movable scale member relative to said fixed scale member, and setting means within said casing operatively connected to said movable scale member for moving said movable scale member and stylus member independently of said spiral groove and said drive means to a predetermined position with respect to said fixed scale member.

References Cited in the file of this patent

UNITED STATES PATENTS

| | | |
|---|---|---|
| 209,164 | Farnsworth | Oct. 22, 1878 |
| 315,585 | Williamson | Apr. 14, 1885 |
| 448,368 | Reading | Mar. 17, 1891 |
| 1,033,866 | Blaine | July 30, 1912 |
| 1,264,067 | Harper | Apr. 23, 1918 |
| 1,859,291 | De Moss | May 24, 1932 |
| 2,460,190 | Petroff et al. | Jan. 25, 1949 |